Patented Aug. 2, 1927.

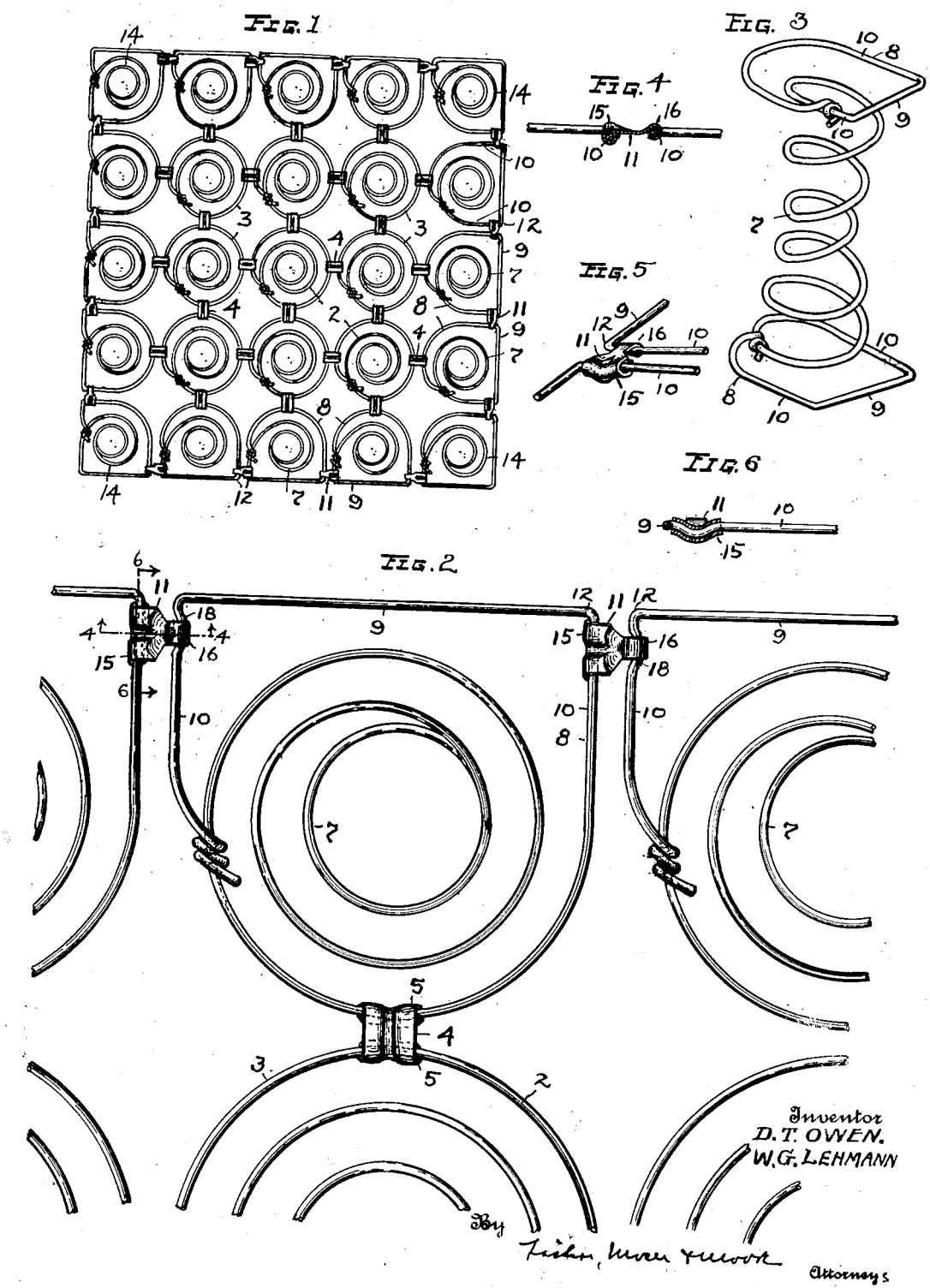

1,637,584

UNITED STATES PATENT OFFICE.

DAVID T. OWEN AND WESLEY G. LEHMANN, OF CLEVELAND, OHIO; SAID LEHMANN ASSIGNOR TO SAID OWEN.

SPRING CUSHION, MATTRESS, SEAT, AND BED.

Application filed October 25, 1922. Serial No. 596,716.

This invention relates to an improvement in spring cushions, mattresses, seats and beds, and one object of the invention is to provide a unitary spring structure made of coiled springs and comprising border springs formed in a particular way to provide a substantially continuous straight border edge when the springs are banked closely together. The springs in this spring structure may be tied, connected, or held together in various ways, but the preferred way is to unite the springs together with clips which are made rigid and immovable parts of at least one spring where fastened thereto and in the case of the border springs to situate these clips where they will coact with each other and practically form co-extensive parts of the straight border edge of the spring structure.

In the annexed drawings, Fig. 1 is a plan view on a reduced scale of a spring cushion embodying the invention, and Fig. 2 is a similar view on a large scale of a portion of the same fabricated structure. Fig. 3 is a perspective view of one of the border springs having straight sided end loops. Fig. 4 is a sectional view, on line 4—4 of Fig. 2, showing the mode of uniting the springs together, and Fig. 5 is a perspective view of one clip or union member connecting adjoining portions of two springs. Fig. 6 is a sectional view on line 6—6 of Fig. 2 showing the bend or offset made in the wire and in the clip to unite them rigidly together.

In fabricating a spring seat, cushion or mattress, any given number of coiled compression springs 2 are united together in a straight row and then similar rows of such springs are affixed parallelly to each other in close juxtaposition making a bank of springs in which the corresponding end loops of all of the springs lie in the same plane. The main body of this spring structure may be formed of wire springs having round end loops 3 and these loops may be sustained in spaced relation by any suitable means, and our preferred way is to connect and unite the end loops together by metal clips or tie members 4 which are crimped upon the wire to rigidly unite each loop 3 to the corresponding loops of the adjoining springs. One form of clip which may be used but is not specifically claimed in this application is indented medially across the curled or eye portions 5 at the opposite ends of the clip where connected with the adjoining wires and each wire is indented and offset also in these curled connecting portions, thereby so uniting the two wires together that neither wire may turn in the clip or the clip have pivotal or hinge movement on the wire. In this way when the end loops of all the springs 2 are so united a practically rigid one-piece skeleton frame is produced and any flexure out of the horizontal plane must occur in the wire itself, which it should be understood is spring wire and free to bend or flex within limits.

A series of squared border springs 7 are fastened in the same way by clips 4 to the outer row of the round springs 2 on the four sides of this fabricated structure, but these border springs differ from the others in that their end loops 8 are straight sided on three sides at least in which case a relatively long straight section 9 is formed equal in length to the diameter of the round end loops 3 of the inner main springs 2. The other two straight sides 10—10 are shorter and parallel so that when the border springs are assembled together and affixed to the springs 2 a straight side wire 10 of one border spring 7 will parallel another straight side wire 10 of an adjoining border spring, and the front straight sections 9 of all of the border springs in a row will be substantially co-extensive or extended in a straight line. This alignment may be made permanent by uniting the border springs to each other by any suitable means, such as clips 4, of by separate hinge clips 11, preferably attaching and connecting the adjoining side wires 10—10 together at a point relatively near or directly at the corners 12 where the straight side and front wires meet. In this way such clips and the straight sides 9 make a substantially straight and continuous border edge for the fabricated structure, without additional wires or pieces, permitting the spring structure to be encased tightly and snugly in a fabric or pliable covering of any kind, stuffed or padded, without buckling the spring structure and also without showing any irregularity or unevenness at such border edges. The corner springs 14 of the fabricated spring body may be formed with straight sides also, two of which may be of equal length and extended at right angles as shown, and the corners may be rounded more or less as desired.

Clips 11 may be fashioned out of flat stock of any suitable width, and in Figs 2 and 5 one end of the clip is shown relatively wide and the opposite end narrow. The wide end 15 is indented at its middle transversely of the wire and the wire offset within the curled portion of the clip substantially as shown in Fig. 6. This locks the clip and wire rigidly together and in effect this clip becomes a rigid lateral extension of one spring. The narrow end 16 of the clip is curled around the parallel side wire of the adjoining spring and provides a hinge connection with the spring. The rigid connection with one spring and the pivotal connection with the other holds the springs positively apart a fixed or given distance while permitting the springs to incline relatively to each other under an unevenly distributed load and the rigid union of the clip with one spring prevents the clip from operating as a double hinge, that is, prevents an overlapping or interfering relation from taking place between the end loops of adjoining springs.

All the springs constituting the spring structure may be connected together by hinge clips 11 if desired, that is each clip may be indented at one end to rigidly secure it to one spring while the opposite end may be curled around the wire of an adjoining spring to provide a hinge or pivot connection therewith. To avoid side slip of the clip where hinged to a spring, the wire may be offset or bent at each side edge of the hinge eye of the clip, as shown at 18 in Fig. 2.

The invention is not necessarily limited to the use of any particular form of clip or mode of uniting the squared or straight-sided springs together to produce a straight-edged structure. Thus, it is a common practice to secure round springs in spaced relation by wires, cords or strips, and to pocket springs individually in isolated relation in a compartmented container made of woven or other fabric, and the same practices may be followed in producing a spring structure embodying straight-sided springs. But in any case the border springs would be straight-sided to produce a straight border edge, and if desired, the inner assembly of springs may be composed of squared or straight sided springs instead of round springs as delineated in the drawings. Therefore, the invention viewed in its broadest aspect comprehends such old practices, and more specifically the preferred mode of uniting the springs by clips as herein described because of the many advantages to be derived by their use and for the further reason that a spring structure so assembled and united together may be compressed within a padded casing without distortion, or used without a covering or casing, with or without padding materials.

What we claim is:

1. A spring structure, comprising a main central body of coiled springs jointed rigidly together at their corresponding ends and arranged in parallel rows, border springs for said main body of springs having end loops of wire formed with straight sides, and separate clips indented into and rigidly united with each end loop of the border springs and hinged to the next adjacent loop co-extensively with the straight sides thereof.

2. A spring structure, comprising a main body of coiled springs united together rigidly at their corresponding ends, a row of helical border springs at each side of said main body of springs having end coils with angular corners and straight portions extending in substantially straight lines at the border edges of said structure, and narrow metal clips rigidly united with one corner of each of the end coils of said border springs and hinged to the corner of the next spring contiguous to its straight portion.

In testimony whereof we affix our signatures hereto.

DAVID T. OWEN.
WESLEY G. LEHMANN.